(12) United States Patent
Davidson

(10) Patent No.: US 10,463,916 B2
(45) Date of Patent: Nov. 5, 2019

(54) ACTIVE CAMMING DEVICE

(71) Applicant: Erick Matthew Davidson, Piedmont, CA (US)

(72) Inventor: Erick Matthew Davidson, Piedmont, CA (US)

( * ) Notice: Subject to any disclaimer, the term of this patent is extended or adjusted under 35 U.S.C. 154(b) by 0 days.

(21) Appl. No.: 15/627,448

(22) Filed: Jun. 20, 2017

(65) Prior Publication Data
US 2018/0001175 A1 Jan. 4, 2018

Related U.S. Application Data

(60) Provisional application No. 62/357,451, filed on Jul. 1, 2016.

(51) Int. Cl.
| A63B 29/02 | (2006.01) |
| A63B 69/00 | (2006.01) |
| F16B 2/04 | (2006.01) |
| F16B 2/18 | (2006.01) |
| A63B 29/08 | (2006.01) |

(52) U.S. Cl.
CPC ............ *A63B 29/024* (2013.01); *A63B 29/02* (2013.01); *A63B 29/08* (2013.01); *A63B 69/0048* (2013.01); *F16B 2/04* (2013.01); *F16B 2/185* (2013.01); *F16B 2/18* (2013.01)

(58) Field of Classification Search
CPC ......... A63B 29/024; A63B 29/02; F16B 2/04; F16B 2/18; Y10S 248/925
USPC ................................ 248/925, 231.31, 231.9
See application file for complete search history.

(56) References Cited

U.S. PATENT DOCUMENTS

| 3,946,975 A | * | 3/1976 | Lyman, Jr. ........... | A63B 29/024 248/317 |
| 4,184,657 A | | 1/1980 | Jardine | |
| 4,586,686 A | * | 5/1986 | Cason .................. | A63B 29/024 248/231.9 |
| 4,643,377 A | | 2/1987 | Christianson | |
| 4,645,149 A | * | 2/1987 | Lowe .................... | A63B 29/024 248/231.9 |
| 4,712,754 A | * | 12/1987 | Brodie ................. | A63B 29/024 248/200 |
| 4,781,346 A | * | 11/1988 | Banner ................ | A63B 29/024 248/231.9 |
| 4,832,289 A | | 5/1989 | Waggoner | |
| RE33,104 E | * | 10/1989 | Taylor .................. | A63B 29/024 248/231.85 |
| 4,923,160 A | | 5/1990 | Waggoner | |

(Continued)

FOREIGN PATENT DOCUMENTS

EP          0226829 B1 * 8/1989 ........... A63B 29/024

*Primary Examiner* — Eret C McNichols

(57) ABSTRACT

A larger active camming device including a plurality of opposed camming lobes, a cam head, a retraction system, and a connection system. The cam head includes a stem end and two parallel axles coupled to the stem end. The retraction system is a unique system comprised of a trigger, flexible trigger wires, control horns, and torsion springs. The control horns couple the trigger to the camming lobes and are configured to reduce buckling and allow greater camming range. The retraction system can also include a retraction locking mechanism. The locking mechanism is used to store the cam in a retracted and locked position until it is needed by the climber. When needed, the climber can easily unlock and extend the camming lobes with one hand.

15 Claims, 6 Drawing Sheets

(56) References Cited

U.S. PATENT DOCUMENTS

| | | | | |
|---|---|---|---|---|
| 5,617,767 A * | 4/1997 | Nikoden | ............... | A63B 29/024 29/259 |
| 5,860,629 A * | 1/1999 | Reed | ................... | A63B 29/024 248/231.9 |
| 6,109,578 A * | 8/2000 | Guthrie | ................ | A63B 29/024 248/231.9 |
| 6,283,426 B1 * | 9/2001 | Guthrie | ................ | A63B 29/024 248/231.21 |
| 6,679,466 B2 | 1/2004 | Brown | | |
| 6,736,359 B2 | 5/2004 | Murray | | |
| 7,014,156 B2 * | 3/2006 | Apezetxea | ........... | A63B 29/024 248/231.9 |
| 7,040,588 B2 | 5/2006 | Lowe | | |
| 7,278,618 B2 | 10/2007 | Tusting | | |
| 7,740,223 B2 | 6/2010 | Field | | |
| 7,743,885 B2 * | 6/2010 | Martin | ...................... | A45F 3/12 182/230 |
| 7,959,118 B2 | 6/2011 | Tusting | | |
| 7,959,119 B2 * | 6/2011 | Tusting | ................ | A63B 29/024 248/231.9 |
| 8,839,591 B2 * | 9/2014 | Guthrie | ............... | E04G 21/3276 248/231.9 |
| 9,079,065 B2 | 7/2015 | Perkins | | |
| 9,302,154 B2 * | 4/2016 | Steck | .................... | A63B 29/024 |
| 9,370,692 B2 * | 6/2016 | Czech | .................. | A63B 29/024 |
| 2003/0057337 A1 * | 3/2003 | Brown | ................ | A63B 29/024 248/231.9 |
| 2004/0035992 A1 * | 2/2004 | Watts | ................... | A63B 29/024 248/231.9 |
| 2005/0037023 A1 * | 2/2005 | Field, Jr. | ................ | A63B 29/024 424/195.15 |
| 2005/0218282 A1 * | 10/2005 | Phillips | ................ | A63B 29/024 248/231.9 |
| 2006/0231708 A1 * | 10/2006 | Robertson | ............ | A63B 29/024 248/231.9 |
| 2009/0134294 A1 | 5/2009 | Hemsley | | |
| 2009/0230268 A1 * | 9/2009 | Maltsev | ................. | A63B 29/02 248/231.9 |
| 2015/0290499 A1 * | 10/2015 | Baker | .................... | A45F 5/004 248/231.31 |

* cited by examiner

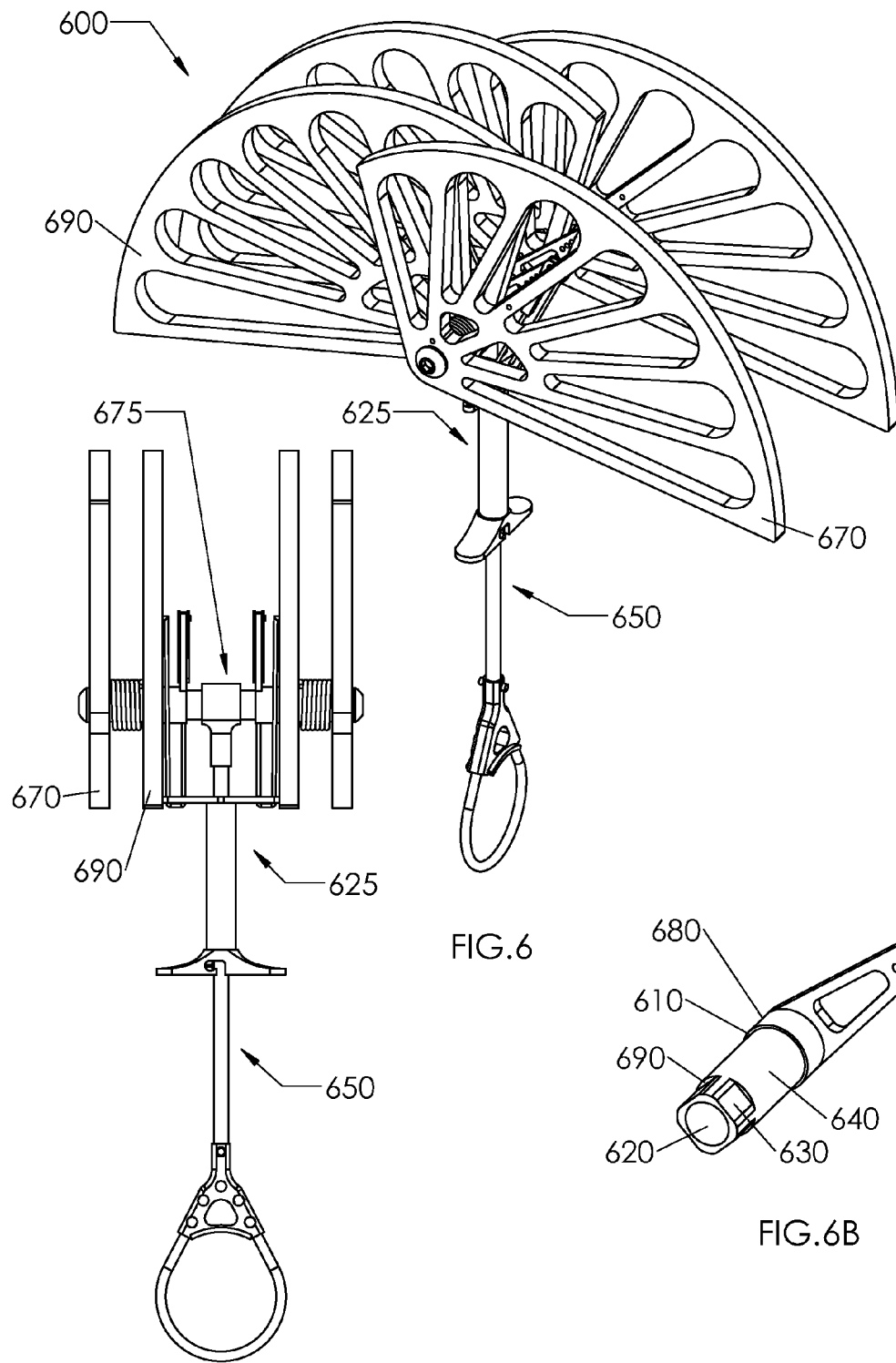
FIG.6
FIG.6A
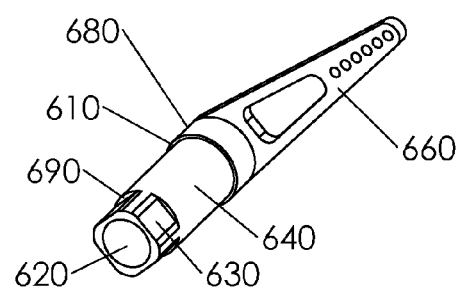
FIG.6B

ACTIVE CAMMING DEVICE

CROSS-REFERENCE TO RELATED APPLICATIONS

This application claims priority to, and benefit of, U.S. Provisional Patent Application No. 62/357,451, filed on Jul. 1, 2016. The entire contents of that application are incorporated by reference herein.

FIELD OF THE INVENTION

The invention generally relates to active camming devices designed to protect climbers. In particular, the present invention relates to improved larger camming devices.

BACKGROUND OF THE INVENTION

Climbers use active and passive clean protection devices for either protecting a climber in the event of a fall or for artificially supporting a climber's weight. Clean protection devices cam or wedge into a crack, groove, hole, or taper to support outward forces. Passive protection devices have no moving parts and typically wedge into constrictions to support outward forces. There are numerous types of passive protection devices including nuts, hexes, tri-cams, and chocks. Active protection devices contain at least two moving parts to enable a range of shapes and make it easier to insert and remove. Active camming devices are a subset of active protection devices and describe devices that use a retraction system to rotate two or more opposing camming lobes. The camming lobes are generally spring biased into an expanded position and are retracted with the retraction system to fit into different size cracks. Active camming devices are further divided into single axle and double axle devices. Single axle camming devices have a single central axle around which all camming lobes pivot. Double axle camming devices typically have two parallel axles on which opposing camming lobes pivot separately. Double axle devices are generally preferable because they have a much larger camming range.

The primary disadvantage of active camming devices is their considerable weight. For smaller camming devices, in particular, a large portion of the weight is in the connection system. The connection system connects the cam lobes to a clip-in point. The connection system usually consists of either a single or double stem connecting the cam head to the clip-in point. Double stem systems usually use a U-shaped wire rope for the stem, which creates a natural clip-in point at the end. Single stem systems are preferred because they are generally lighter and more flexible than double stem systems. For single stem systems, the clip-in point is usually either a loop formed in the wire rope or a separate part with an orifice that is either swaged or brazed to the single stem. The choice of a single or double stem system is independent of whether the camming device is a single or double axle device.

Retraction systems on active camming devices allow the climber to actuate the camming lobes from an expanded position to a retracted position. The difference of these two positions is called the camming range. Retraction systems generally consist of a trigger and flexible trigger wires that connect directly to the camming lobes. For smaller camming devices it is common for the trigger to be connected to a stem tube and then a yoke that is attached to the trigger wires. This configuration allows for stem compliance while reducing the chance of stem buckling. Trigger wires are typically situated between each set of two opposing cam lobes in camming devices with four camming lobes.

Larger active camming devices have several drawbacks. Larger camming devices must have longer stems to accommodate the larger camming lobes, and this leads to problems with stem buckling during retraction and increased stem weight. Retraction systems in larger cams do not utilize the benefits of a stem tube and yoke to prevent buckling because the trigger wires must clear the retracting camming lobes, and therefore must be nearly the same length as the stem. Larger active camming devices either use a single axle design or do not utilize the full benefit of the double axle design. In a double axle design, camming range increases as the distance between axles increases. Double axle designs do not realize the full benefit of camming range in larger camming devices because the axles must be placed relatively close to each other. The axles must be placed relatively close to each other to allow the trigger wires to wrap around the axles and remain in close proximity to the center of rotation of the camming lobe. In addition to reduced camming range, the other drawback of requiring the axles to be close to each other is that buckling of the camming lobes is a concern due to the unsupported length of each camming lobe. Single axle designs also have a long unsupported camming lobe length and therefore have the same camming lobe buckling concern. To prevent buckling, camming lobes in larger camming devices are made thicker, which adds weight.

A further drawback of larger camming devices is that they are bulky, particularly in their extended position. Climbers typically carry camming devices in their extended position because they are spring biased in this position and there is no practical method of locking them in a retracted position. It is desirable to carry larger camming devices in the retracted position because they are less bulky and also because they are less likely to snag on rock imperfections. Sometimes climbers will tie a camming device in the retracted position with a piece of cord but this is not very efficient and requires two hands to release.

Therefore, there is a need in the industry for larger camming devices that are lighter and have more camming range. There is also a need for larger camming devices to have a retraction locking mechanism that is easy to use and is deployable with one hand.

SUMMARY OF THE INVENTION

One aspect of the present invention relates to an improved larger active camming device including a plurality of opposed camming lobes, a cam head, a retraction system, and a connection system. The cam head includes a stem end and two parallel axles coupled to the stem end. The retraction system is a unique system comprised of a trigger, an optional stem tube, an optional yoke, trigger wires, optional clevises, control horns, and torsion springs. The connection system includes a clip-in loop, thumb rest, and stem. Another aspect of the present invention relates to an improved larger active camming device that includes a retraction locking mechanism. The locking mechanism is used to store the cam in a retracted and locked position until it is needed by the climber. When needed, the climber can easily unlock and extend the camming lobes with one hand. Another aspect of the present invention relates to an improved larger single axle active camming device that includes many of the same features of the double axle camming device.

Aspects of the present invention represent a significant improvement in larger active camming devices. Existing larger active camming devices have several limitations including small camming range, tendency for both the stem and camming lobes to buckle, excessive weight, and inability to efficiently lock in the retracted position. The improved active camming device and unique retraction system concepts of the present invention overcome these limitations. A larger camming range, resistance to buckling, and lower weight are enabled by a control horn mechanism that positively controls and actuates camming lobes. The control horn mechanism allows the trigger wires to be placed between the two sets of camming lobes, which eliminates the geometrical constraints imposed on existing larger active camming devices. Another aspect of the present invention enables a larger camming device to be locked in the retracted position and deployed with one hand through the use of a unique retraction locking mechanism. The retraction locking mechanism includes a detent position on the retraction system that engages a fixed protrusion on the connection system and allows the camming device to be locked in the retracted position and easily deployed when needed.

These features and advantages will be set forth or will become more fully apparent in the detailed description, figures, and appended claims.

BRIEF DESCRIPTION OF THE DRAWINGS

FIG. 6 is a perspective view of an active camming device in accordance with a third aspect.

FIG. 6A is a side view of the active camming device of FIG. 6

FIG. 6B is a perspective view of the control horn of FIG. 6 of an active camming device.

DETAILED DESCRIPTION

Active camming devices are used by climbers to protect the climber in the event of a fall or to artificially support the climber's weight. One aspect of the current invention relates to an improved larger active camming device including a plurality of opposed camming lobes, a cam head, a retraction system, and a connection system. The cam head includes a stem end and two parallel axles coupled to the stem end. The retraction system is a unique system comprised of a trigger, an optional stem tube, an optional yoke, trigger wires, optional clevises, control horns, and torsion springs. The connection system includes a clip-in loop, thumb rest, and stem. Another aspect of the current invention relates to an improved larger active camming device that includes a retraction locking mechanism. The locking mechanism is used to store the cam in a retracted and locked position until it is needed by the climber. When needed, the climber can easily unlock and extend the camming lobes with one hand. Another aspect of the present invention relates to an improved larger single axle active camming device that includes many of the same features of the double axle camming device. The aspects and figures describe larger camming devices but the concepts should not be limited to larger camming devices and are also applicable to smaller camming devices.

The following terms are defined as follows:

Larger active camming devices—camming devices configured to protect cracks ranging from 65 mm (2.5 inches) to 400 mm (16 inches) in width. Standard commercially available camming devices go up to a maximum extended width of about 196 mm (7.7 inches). The very largest practical camming devices produced go up to a maximum extended width of 305 mm (12 inches).

Camming range—the maximum extended width for a given camming device minus its minimum retracted width.

Camming ratio—the maximum extended width for a given camming device divided by its minimum retracted width. Single axle camming devices have a maximum camming ratio of about 1.58. Double axle camming devices can have camming ratios as high as about 1.82 depending on axle separation and camming angle. Larger commercially available camming devices have camming ratios of about 1.71.

Figure 1:
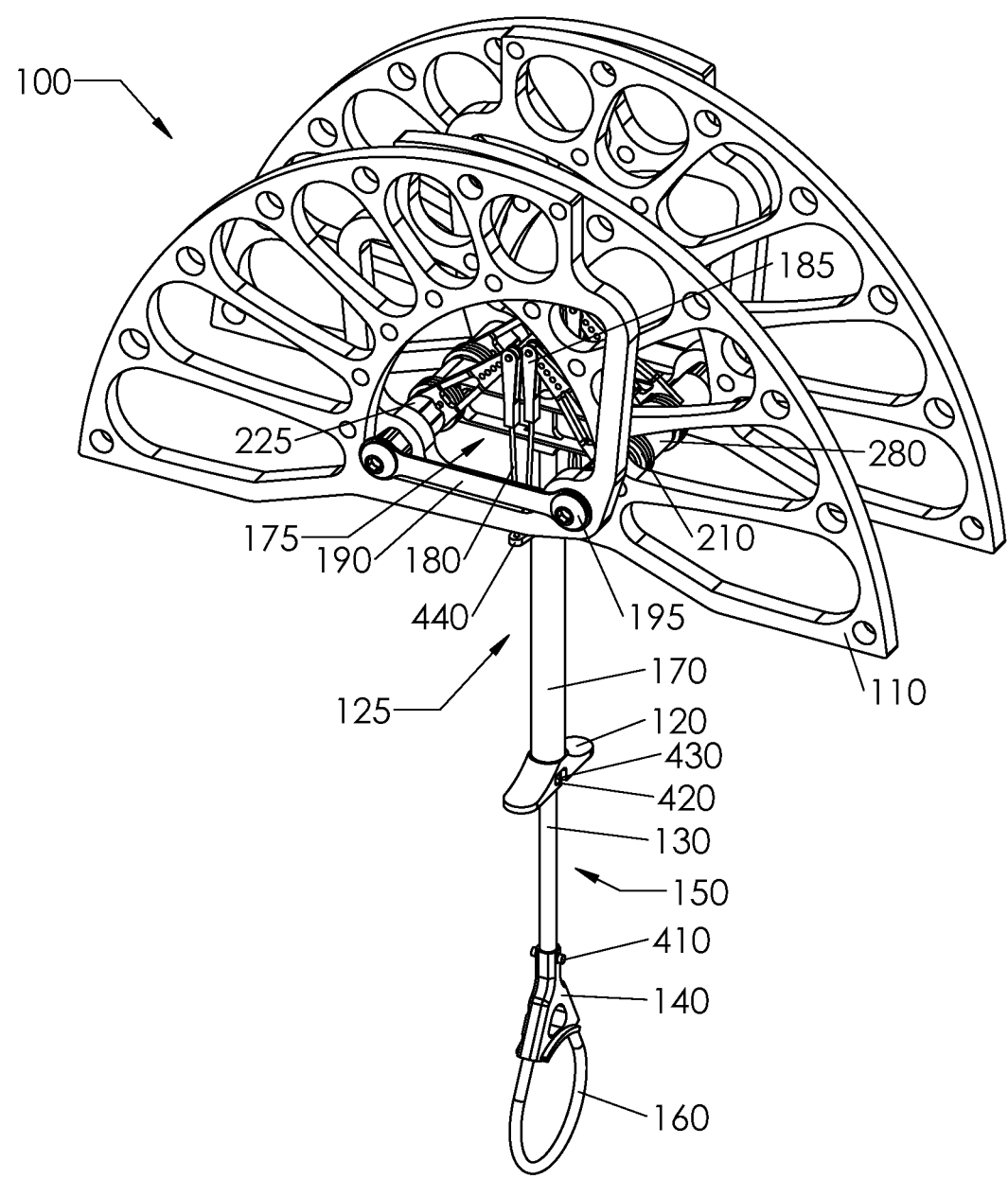
FIG. 1 is a perspective view of an active camming device in an extended position in accordance with one aspect.
Figures 2, 2A:
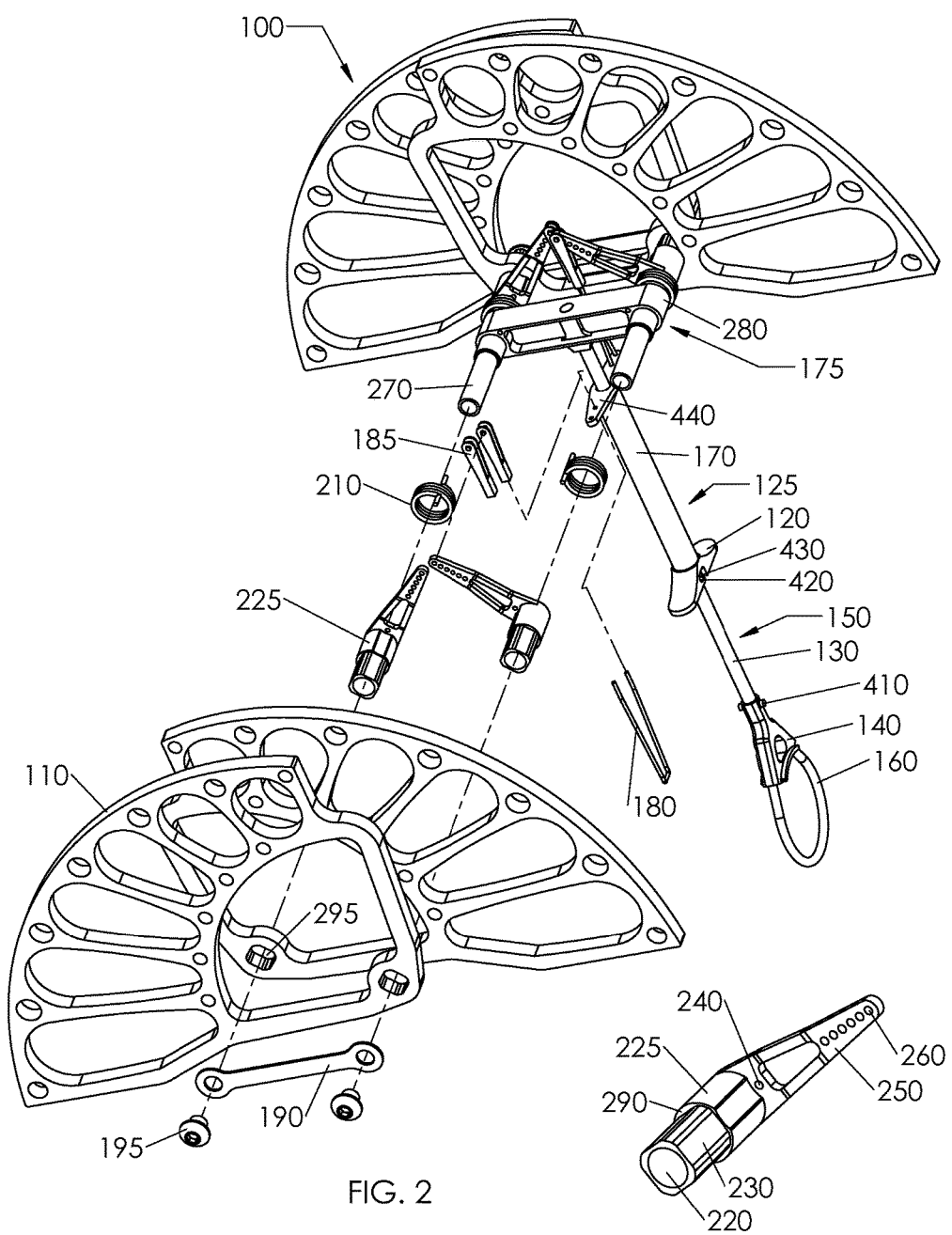
FIG. 2 is an exploded perspective view of the active camming device of FIG. 1.
FIG. 2A is a perspective view of one aspect of the control horn of FIG. 2 of an active camming device.

One aspect of the invention is illustrated in FIGS. 1-2. FIG. 1 shows a perspective view of an active camming device in the fully extended position and is generally designated at 100. FIG. 2 shows a partially exploded perspective view of the active camming device 100. The camming device 100 shown has a maximum extended width of 253 mm (9.96 inches), a minimum retracted width of 145.5 mm (5.73 inches), a camming range of 107.5 mm (4.23 inches), a camming ratio of 1.74, and a weight of 525 grams. A similarly sized commercial camming device has a maximum extended width of 228.5 mm (9 inches), a minimum retracted width of 145 mm (5.7 inches), a camming range of 83.5 mm (3.3 inches), a camming ratio of 1.58, and a weight of 880 grams. Camming devices of the aspect shown in FIGS. 1-2 have been designed to have an extended width as large as 400 mm (16 inches) and as small as 89 mm (3.5 inches).

The camming device 100 of FIGS. 1-2 is comprised of a plurality of opposed camming lobes 110, a connection system 150, a retraction system 125, and a cam head 175. The connection system 150 includes a clip-in loop 160, a thumb rest 140, and stem 130. Many embodiments of the connection system are possible and are common in the industry. The stem 130 is situated at the center of the camming device 100 to evenly distribute load between camming lobes 110. The stem 130 is typically long enough to enable retraction of the camming lobes 110 without interfering with the climber's hand. The stem 130 can be made from solid bar, wire rope, or composite depending on the desired stiffness. The stem 130 can be brazed, swaged, or otherwise attached to the thumb rest 140 on one side and to the stem end 280 on the other side by similar methods. The thumb rest 140 enables coupling of the stem 130 to the clip-in loop 160 and provides an ergonomic surface to grasp the camming device 100. The thumb rest 140 optionally includes a protrusion 410, which will be explained below in more detail. The thumb rest 140 can be replaced by a simple swage fitting in another aspect. The clip-in loop 160 is optional if the thumb rest 140 can substitute as an attachment point for a sling or cord. The clip-in loop 160 is illustrated as a separate part but could also be a continuous loop portion of the stem 130 in another aspect.

The retraction system 125 includes a trigger 120, stem tube 170, yoke 440, trigger wires 180, clevises 185, control horns 225, and torsion springs 210. The trigger 120 is slidably coupled to the stem 130 and retraction versus the thumb rest 140 enables retraction of the camming lobes 110. The trigger 120 has a shape that is easy to grasp with the climber's fingers. The trigger 120 optionally includes detent 420 and slot 430 features, which will be explained below in more detail. The trigger 120, stem tube 170 and yoke 440 are coupled (more clearly shown in FIG. 4). There are many known common methods to do this including, but not limited to, swage fittings, press fits, barbed fittings, adhesives, and others. The stem tube 170 can be made from any type of tubing, hose, or sheath material. The yoke 440 is coupled to the trigger wires 180. The trigger wires 180 can either be compliant or slidably coupled to the yoke 440 to allow independent movement of the camming lobes 110. The trigger wires 180 are coupled to the clevises 185. The clevises 185 are optional but they are usually threaded and can allow for easy adjustment of trigger wire 180 length. The clevises 185 are rotatably coupled to the control horns 225 at clevis hole 260. In another aspect of the invention, the stem tube 170, yoke 440, and clevises 185 are not necessary and the trigger wires 180 can be attached directly to the trigger 120 and the clevis hole 260.

FIG. 2A is a perspective view of a control horn 225. The control horns 225 are comprised of a substantially cylindrical portion and a lever arm 250. These are illustrated as one part but can be two separate coupled parts. Opposing control horns 225 have bent and offset lever arms 250 to avoid clashing with each other during camming lobe 110 retraction. The control horns 225 have cylindrical bores 220 that are rotatably coupled to axles 270. The control horns 225 are coupled to the torsion springs 210 through spring hole 240. The other end of the torsion springs 210 is coupled to the stem end 280. The torsion springs 210 bias the camming lobes 110 to rotate outwards to engage opposing rock faces. The torsion springs 210 can take many different configurations including different attachment methods, different shapes, and others known to those skilled in the art. In another aspect, the torsion springs 210 can also be coupled to each other as one continuous wire to avoid being directly coupled to the stem end 280. Clevises 185 attach to the lever arms 250 at clevis hole 260. Different clevis hole 260 locations can be used to change the retraction force and distance. The substantially cylindrical portion of the control horn 225 has a stepped face 290 that transitions into a square drive 230. The stepped face 290 restricts axial movement of the inner camming lobes 110, which increases their buckling resistance. The square drive 230 has rounded corners for manufacturability. The square drive 230 is coupled to a substantially square hole 295 in the camming lobes 110. Assembly of the camming lobes 110 onto the control horns 225 is much easier if there is a clearance fit between the square hole 295 and the square drive 230. One skilled in the art will appreciate that many different types of positive drives between the control horns 225 and camming lobes 110 are possible including, but not limited to, press-fits, hexagonal drives, splines, and others.

The cam head 175 includes a stem end 280, parallel axles 270, endcaps 190, and fasteners 195. The stem end 280 shown is substantially I-beam shaped to minimize weight. The stem end 280 is subject to bending stresses and is typically made from metal. The axles 270 are coupled to the stem end 280. The axles 270 are also typically made of metal and can be hollow to minimize weight. The axles 270 have a small step to set the axial position of the control horns 225 but this could also be done with spacers. The endcaps 190 are fixably coupled to the end of the axles 270 with fasteners 195. However, the fasteners 195 are optional and other methods for attaching the endcaps 190 to the axles 270 are acceptable including rivets, pins, brazing, welding, clips, heading, and other methods known to those skilled in the art.

The unique control horn mechanism positively controls and actuates the camming lobes 110 by indirectly coupling the trigger wires 180 to the camming lobes 110 through control horns 225. This configuration offers several advantages. It allows a predetermined retraction force and retraction distance independent of axle spacing or camming lobe geometry. This makes it possible to increase camming range and camming lobe 110 buckling resistance by placing the axles as far apart as desired. Another advantage is that by moving the trigger wires 180 internal to the two sets of camming lobes 110, they do not have to clear the tips of the camming lobes 110 during retraction as they do on conventional camming devices. For larger camming devices, this allows the use of a stem tube 170 and yoke 440, which substantially reduces stem 130 buckling tendencies. As a result, it is possible to use smaller and lighter stems 130. The trigger wires 180 are also one of the most fragile parts of a camming device and placing the trigger wires 180 internal to the camming lobes 110 protects the trigger wires 180 from snagging on rock or other gear.

Figure 3:
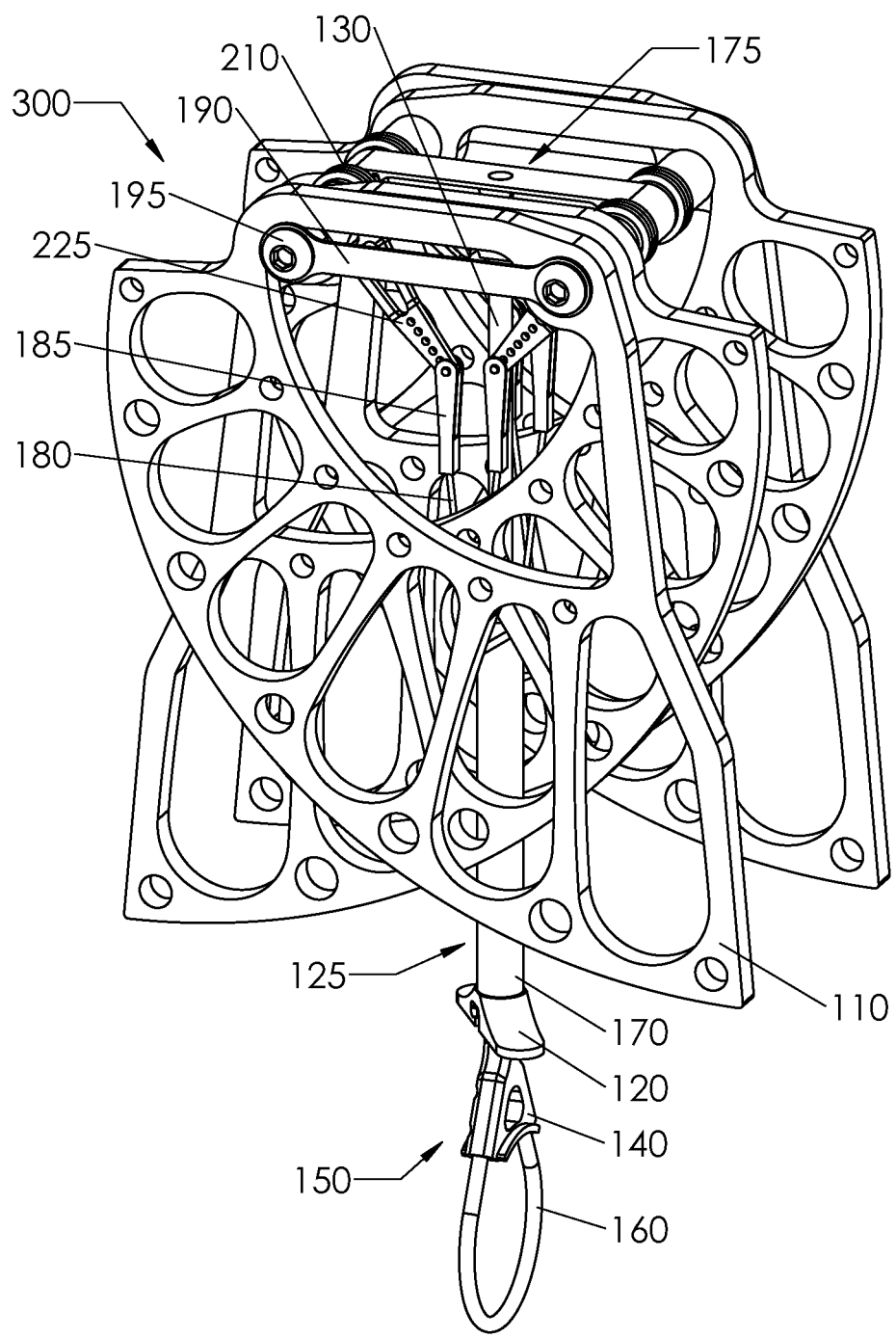
FIG. 3 is a perspective view of the active camming device of FIG. 1 in a retracted and locked position.
Figures 4, 4A:
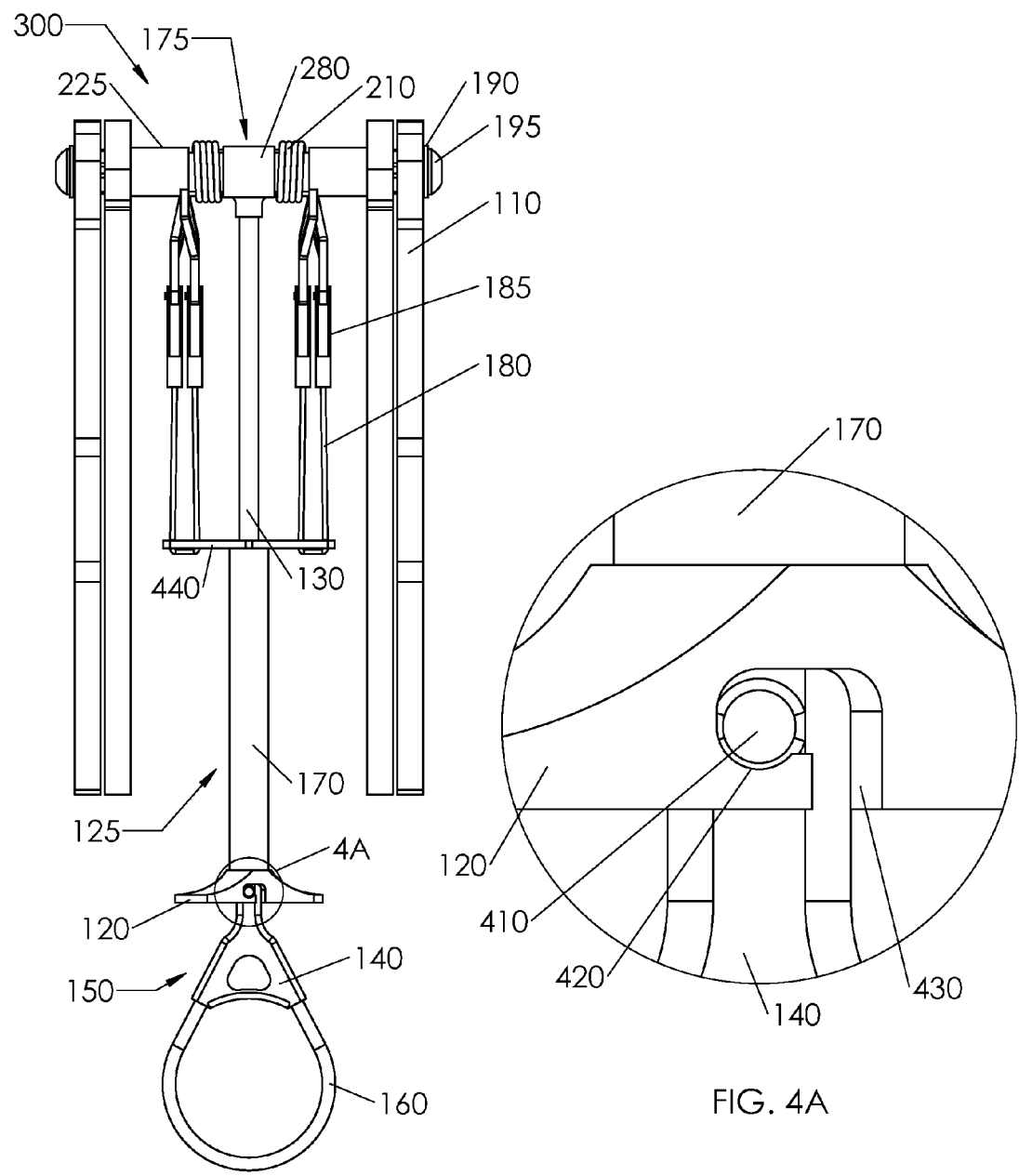
FIG. 4 is a side view of the active camming device of FIG. 3.
FIG. 4A is a detailed view of the retraction system locking mechanism shown in FIG. 4

FIGS. 3-4 show the camming device of FIG. 1 in the fully retracted position, generally designated at 300. FIGS. 3-4 also illustrate the retraction locking mechanism. FIG. 3 is a perspective view and FIG. 4 is a side view that more clearly illustrates components and structure of the retraction system 125. For example, FIG. 4 illustrates how the control horns 225 are bent and offset with respect to each other to avoid clashing during retraction. In another aspect, clashing is avoided by offsetting unbent opposing control horns 225 in the axial direction of the axles 170.

The rotated position of the trigger 120 in relation to the thumb rest 140 indicates that the camming device 300 is locked in the retracted position. FIG. 4A is a detail view of how the retraction locking mechanism works. There is a slot 430 in the trigger 120 that clears a protrusion 410 on the thumb rest 140 during retraction. Then the trigger 120 is rotated about the stem 130 so that the protrusion 410 falls into a detent 420 in the trigger 120. In one aspect, the trigger 120 is rotated by approximately 30 degrees and the rotation is accommodated in the compliance of the stem tube 170 and trigger wires 180. The torsion springs 210 bias the retraction system 125 towards the extended position (the trigger 120 is biased away from the thumb rest 140) and keep the camming device 300 in the locked position until the climber needs to unlock and extend the camming lobes 110. Unlocking the trigger 120 from the thumb rest 140 is easy to accomplish with one hand by twisting the trigger 120 so that the slot 430 is aligned with the protrusion 410. The curvature of the detent 420 aids in unlocking the trigger 120 by providing a mechanical advantage and allows the climber to unlock and extend the camming lobes 110 with minimal effort. It will be appreciated that numerous alternative shapes, manufacturing methods, and locking methods are possible in accordance with the aspect shown in FIG. 4A. For example, the slot 430 and detent 420 features could be in the form of an internal closed groove within the trigger 120. As another example, the protrusion 410 could be a separate part that is fixably attached to the stem 130. As yet another example, the protrusion 410 could be on the trigger 120, and the slot 430 and detent 420 features as part of the thumb rest 140. The retraction locking mechanism features are optional and do not affect conventional operation of any of the illustrated camming devices.

Figures 5, 5A:
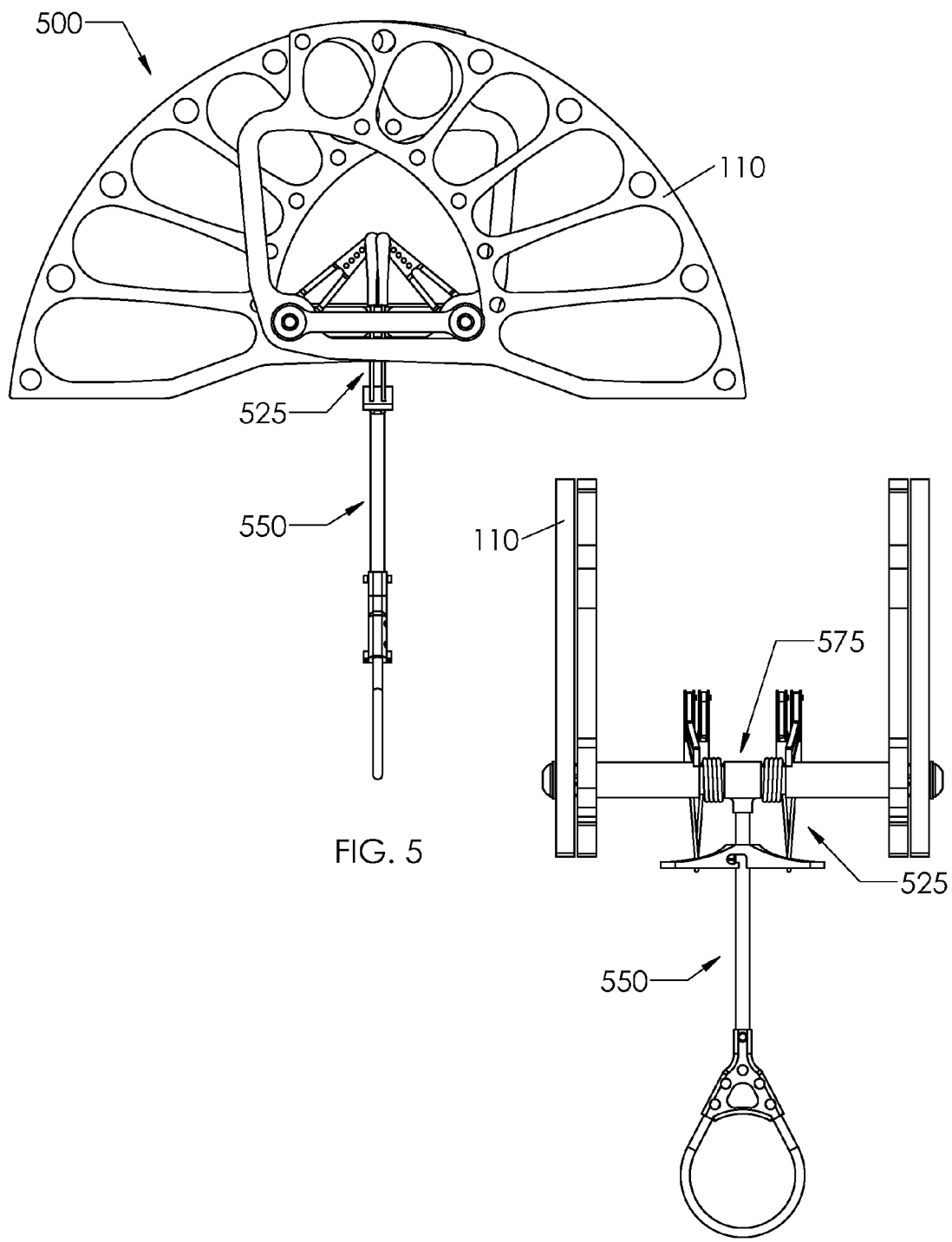
FIG. 5 is a front view of an active camming device in accordance with a second aspect.
FIG. 5A is a side view of the active camming device of FIG. 5

In another aspect of the invention, active camming device 500 in FIGS. 5-5A illustrate a camming device with a shortened connection system 550. In this aspect, the distance between the two sets of camming lobes 110 is increased with a wider cam head 575 so that a climber can fit her hand between the two sets of camming lobes 110. The connection system 550 and retraction system 525 can then be shortened substantially to only include a nominal trigger wire length plus the necessary retraction distance.

Another aspect of the invention is illustrated in FIGS. 6-6B, generally designated at 600. This aspect relates to a single axle active camming device utilizing a similar control horn based retraction system. A single axle camming device forgoes the increased camming ratio and camming lobe buckling resistance of the double axle designs but has fewer parts. The connection system 650 and cam head 675 are similar to that of a double axle design but there is only one axle coupled to a stem end. The retraction system 625 is substantially different from a double axle design. For a single axle camming device, there can be one control horn 680 per set of two opposing camming lobes (inner camming lobe 690 and outer camming lobe 670), which is rotatably coupled to the axle through bore 620 and positively drives the outer camming lobe 670 in rotation through square drive 630. The outer camming lobe 670 has a matching square hole and is situated against stepped face 690. The inner camming lobe 690 is rotatably coupled to an outer axle 640 on the control horn 680 with the inner camming lobe 690 situated against a second stepped face 610 on the control horn 680. The outer axle 640 passes through a clearance fit bore on the inner camming lobe 690 to positively drive the outer camming lobe 670 through lever arm 660. Each set of two camming lobes can have one trigger wire attached to the control horn 680 lever arm 660 through an optional clevis controlling the outer camming lobe 670 and the other trigger wire attached directly to the inner camming lobe 690. Each set of camming lobes is biased in the extended position by a single torsion spring coupled to one inner camming lobe 690 and one outer camming lobe 670. One skilled in the art will appreciate that many different types of drives and fits between the control horns 680 and outer camming lobes 670 are possible including, but not limited to, press-fits, hexagonal drives, splines, and others. Similarly, the inner camming lobes 690 can be rotatably coupled to the control horns 680 by many methods including clearance fits, bushings, press-fit bearings, and others.

I claim:

1. An active camming device comprising:
   a cam head comprising a stem end coupled to two parallel axles;
   a plurality of camming lobes rotatably coupled to the two axles;
   a connection system coupled to said stem end, and said connection system comprising a stem coupled to said stem end, and a thumb rest coupled to said stem;
   a retraction system coupled to the plurality of camming lobes;
   said retraction system further comprising:
      a trigger slidably coupled to said connection system,
      a plurality of trigger wires coupled to said trigger,
      a plurality of springs coupled to the plurality of camming lobes, and
      a plurality of control horns, each control horn rotatably coupled to one of the axles and having
         a lever arm coupled to said trigger wires, and
         a portion extending from the lever arm that is coupled to each camming lobe by a positive drive, wherein,
      the portion of at least one of the plurality of control horns passes through one of the plurality of camming lobes and is coupled to an adjacent camming lobe.

2. The active camming device of claim 1, wherein the plurality of camming lobes is comprised of two sets of opposed camming lobes, each set comprised of an inner camming lobe and an outer camming lobe, the connection system situated between the two sets.

3. The active camming device of claim 1, wherein the plurality of camming lobes is comprised of two sets of opposed camming lobes, each set comprised of an inner camming lobe and an outer camming lobe, the retraction system situated between the two sets.

4. The active camming device of claim 1, wherein the positive drive is a square drive, spline, hexagonal drive, or press-fit.

5. The active camming device of claim 1, wherein the lever arm is coupled to the trigger with compliant trigger wires or slidably coupled rigid wires.

6. The active camming device of claim 1, wherein the plurality of camming lobes is comprised of two sets of opposed camming lobes, the retraction system situated between the two sets, the two sets disposed far enough apart so that a human hand can fit between the two sets, whereby the connection system and retraction system can be shortened to a length that accommodates only the distance needed for camming lobe retraction.

7. The active camming device of claim 1, further comprising a stem tube coupled to the trigger and a yoke coupled to said stem tube, whereby stem buckling resistance is increased.

8. The active camming device of claim 1, further comprising a retraction locking mechanism.

9. The active camming device of claim 1, wherein the retraction system further comprises a plurality of clevises that couple the plurality of trigger wires to the plurality of control horns.

10. The active camming device of claim 1, wherein the retraction system further comprises a plurality of clevises that couple the plurality of trigger wires to the plurality of control horns, wherein at least one of the plurality of clevises is threaded.

11. The active camming device of claim 1, wherein the portion of the at least one of the plurality of control horns passes through an inner camming lobe and is coupled to an outer camming lobe.

12. An active camming device comprising:
   a cam head;
   a plurality of camming lobes coupled to said cam head;
   a connection system coupled to said stem end, and said connection system comprising a stem coupled to said stem end, and a thumb rest coupled to said stem;
   a retraction system coupled to the plurality of camming lobes;
   said retraction system further comprising:
      a trigger slidably coupled to said connection system, and
      a plurality of springs coupled to the plurality of camming lobes;
   a retraction locking mechanism comprising:
      a protrusion fixably coupled to said connection system;

a slot and detent on said trigger adapted to engage the protrusion;

whereby the retraction system is held in a retracted position.

13. The active camming device of claim 12, wherein the retraction locking mechanism can be released with one hand.

14. The active camming device of claim 12, wherein the retraction locking mechanism can be released by rotating said trigger so that the protrusion disengages from the detent and aligns with the slot.

15. The active camming device of claim 12, wherein the retraction locking mechanism further comprises a curvature on the detent that provides a mechanical advantage for releasing the retraction locking mechanism.

* * * * *